United States Patent
Baumberger

(10) Patent No.: US 7,437,613 B2
(45) Date of Patent: Oct. 14, 2008

(54) PROTECTING AN OPERATING SYSTEM KERNEL FROM THIRD PARTY DRIVERS

(75) Inventor: Daniel P. Baumberger, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 926 days.

(21) Appl. No.: 10/768,251

(22) Filed: Jan. 30, 2004

(65) Prior Publication Data

US 2005/0172305 A1     Aug. 4, 2005

(51) Int. Cl.
*G06F 11/00* (2006.01)

(52) U.S. Cl. .......................... 714/38; 719/324

(58) Field of Classification Search ............ 714/38; 719/324

See application file for complete search history.

(56) References Cited

U.S. PATENT DOCUMENTS

| | | | | |
|---|---|---|---|---|
| 4,649,479 A | * | 3/1987 | Advani et al. | 718/1 |
| 4,674,038 A | * | 6/1987 | Brelsford et al. | 714/15 |
| 5,590,324 A | * | 12/1996 | Leung et al. | 713/324 |
| 5,889,988 A | * | 3/1999 | Held | 718/103 |
| 6,040,515 A | * | 3/2000 | Mukojima et al. | 84/603 |
| 7,103,529 B2 | * | 9/2006 | Zimmer | 703/27 |
| 7,260,815 B1 | * | 8/2007 | Chen et al. | 717/134 |
| 2002/0143842 A1 | * | 10/2002 | Cota-Robles et al. | 709/1 |
| 2002/0194496 A1 | * | 12/2002 | Griffin et al. | 713/200 |
| 2004/0003324 A1 | * | 1/2004 | Uhlig et al. | 714/38 |
| 2004/0015966 A1 | * | 1/2004 | MacChiano et al. | 718/1 |
| 2005/0108440 A1 | * | 5/2005 | Baumberger et al. | 710/1 |
| 2005/0132365 A1 | * | 6/2005 | Madukkarumukumana et al. | 718/1 |
| 2007/0074226 A1 | * | 3/2007 | Zimmer et al. | 719/321 |

* cited by examiner

*Primary Examiner*—Emerson C Puente
(74) *Attorney, Agent, or Firm*—Trop, Pruner & Hu, P.C.

(57) ABSTRACT

By loading deprivileged drivers, such as third party supplied drivers, into a virtual machine under control of a virtual machine monitor, a kernel may be protected from faults that arise on those drivers. When a fault is detected, the system may transition from a guest mode, wherein the third party drivers operate through the virtual machine monitor, to a monitor mode, wherein the monitor takes control and provides appropriate correction if possible. In some cases, the virtual machine monitor may simply destroy and restart the virtual machine. In such cases, it may be possible to overcome the faults without crashing the entire operating system.

20 Claims, 4 Drawing Sheets

PROTECTING AN OPERATING SYSTEM KERNEL FROM THIRD PARTY DRIVERS

BACKGROUND

This invention relates generally to systems for protecting privileged components of a computer system.

In conventional computer systems, a ring architecture is utilized. Level 0, the most privileged level, generally is occupied by the operating system kernel. Level 1 may be occupied by operating system services while level 2 may be occupied by device drivers. Level 3, the least privileged ring, may be occupied by applications.

The various applications occupying level 3 may need to interact with the kernel at level 0. As a result, a fault in an application may result in failure of the operating system. In Windows® operating systems, third party drivers that support various devices associated with the computer system reside in the same privileged address space as the rest of the kernel. When a driver has defects resulting in a processor crash, an entire operating system must be shut down to correct the problem.

Thus there is a need for better ways to protect the operating system kernel from the adverse consequences of defects arising in drivers and particularly in so-called third party drivers supplied by vendors other than the supplier of the operating system.

DETAILED DESCRIPTION

Figure 1:
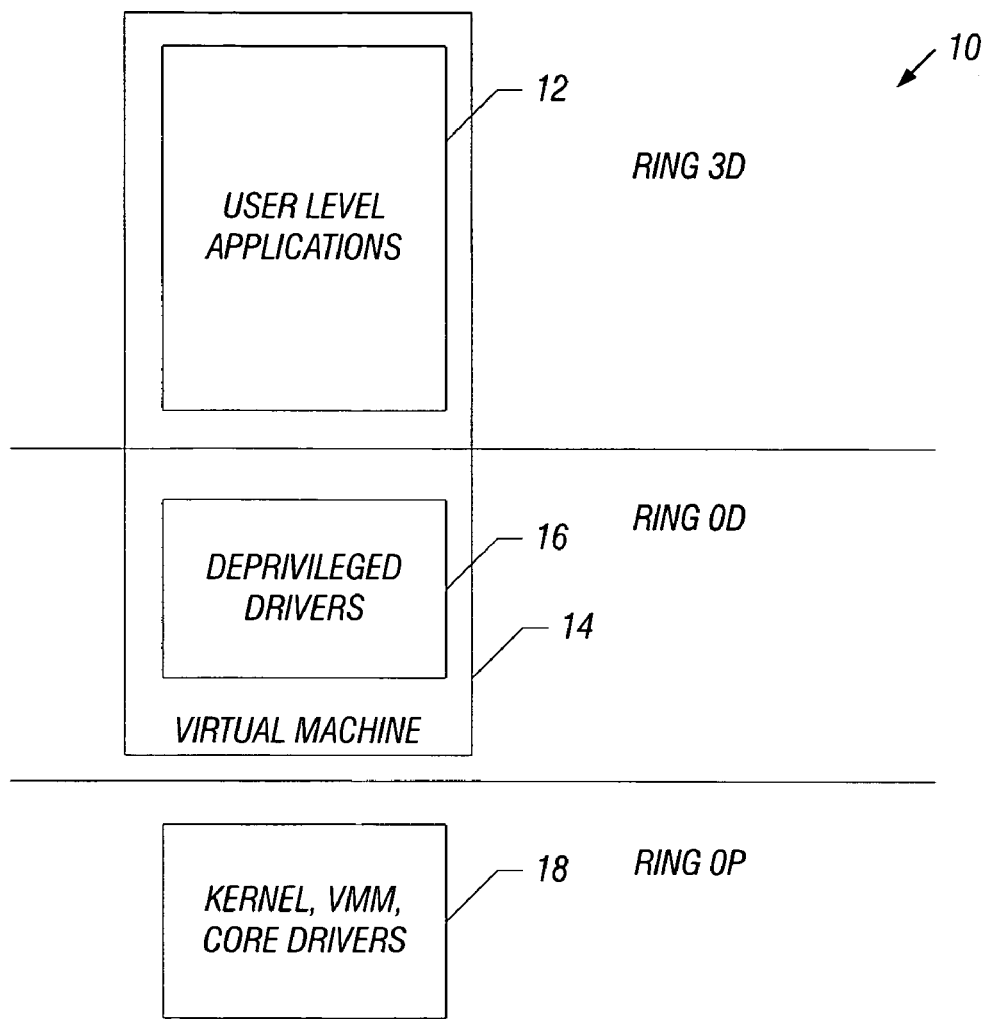
FIG. 1 is a schematic depiction of one embodiment of the present invention.
Figure 5:
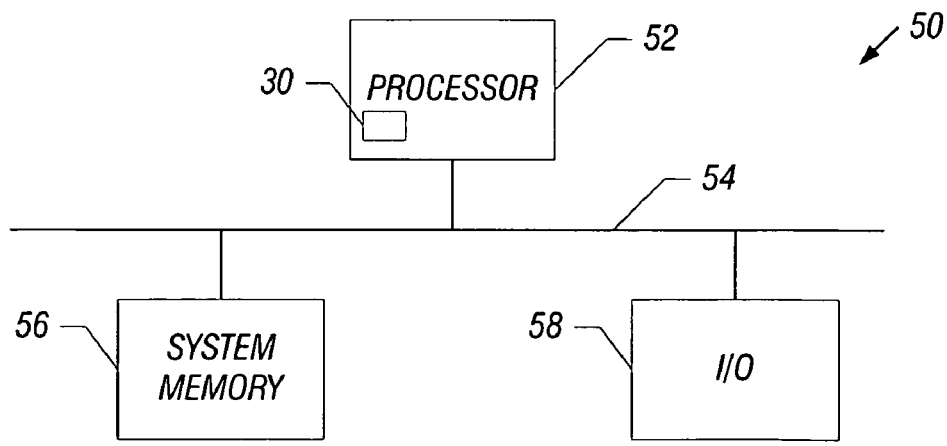
FIG. 5 is a system depiction of one embodiment of the present invention.

Referring to FIG. 1, a software architecture 10 effectively separates deprivileged drivers 16 from the kernel and core drivers 18. The kernel, a virtual machine monitor (VMM) and the core drivers 18 may be situated at ring 0 in privileged space. Conversely, the deprivileged driver 16 may be at ring 0 in a deprivileged space within a virtual machine 14. The virtual machine 14 is a self-contained operating environment that behaves as if it is a separate computer. As a result, the kernel may be protected from faults that arise in the driver 16.

The driver 16 may be a driver for components supplied by a party other than the operating system supplier. As a result, a kernel included in ring 0 is subject to failure caused by a fault in a driver supplied by a vendor other than the supplier or the operating system that runs in the same ring as the kernel. The failure of the kernel may result in the need to restart the entire computer system.

In order to isolate the computer system, and particularly its kernel, from failures in deprivileged drivers, a virtual machine 14 may be established. The virtual machine 14 may be provided as part of a virtual-machine extensions or VMX architecture.

In the VMX architecture, two types of software may be provided. Monitor software is a software which sets up and controls the processor when it is running. Guest software, such as the deprivileged drivers, operate on the same computer system with the monitor. The monitor presents guest software with a processor abstraction called a virtual machine and allows the virtual machine to execute on the processor. As a result, it is possible to isolate the guest software from the kernel using the monitor structure that implements the virtual machine 14.

In one embodiment, the virtual machine 14 may include a deprivileged driver 16 operating at deprivileged ring 0 and user level applications 12 operating at ring 3D. The core drivers included with the kernel 18, may include the file system, memory application, schedulers and the like that run at the most privileged mode of the processor ring 0P.

In the embodiment illustrated in FIG. 1, the virtual machine monitor may be part of the kernel itself or loaded as one of the core system drivers. The kernel loads and creates the virtual machine 14. The kernel then continues loading the deprivileged drivers that it wishes to isolate itself from using the virtual machine 14.

A virtual-machine extension has two types of control transfers. A virtual machine entry allows entry into guest operation. In guest operation user level applications interact with a processor abstraction in the form of a virtual machine 14. A virtual machine exit is when the system exits from guest operation into monitor or host operation. In a virtual machine exit, the processor transfers control to a monitor entry point to allow the monitor to gain control of the processor and take action appropriate under the circumstances that precipitated the virtual machine exit. In guest operation guest software interacts with the processor virtualization, unknown to the guest software.

A fault caused by any driver running inside the virtual machine 14 may cause an immediate virtual machine exit back to the virtual machine monitor portion of the kernel. Here the kernel decides what to do with the fault. It can simply destroy the virtual machine and restart it, or the kernel can take a more advanced approach, trying to isolate the problem that caused the crash.

Figure 2:
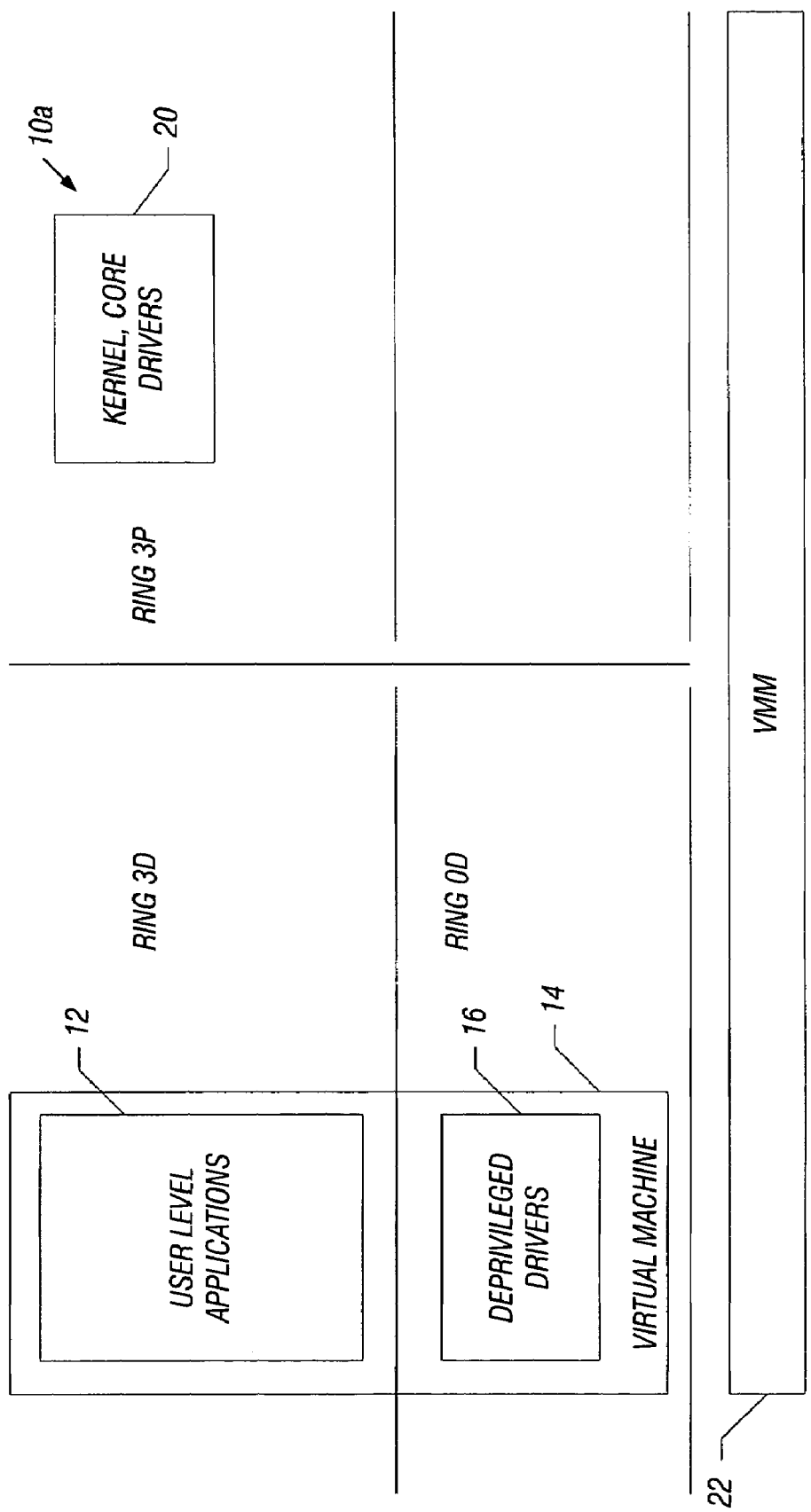
FIG. 2 is a schematic depiction of another embodiment of the present invention.

Referring to FIG. 2, in this case, the virtual machine monitor 22 is provided as a separate entity. The kernel and core drivers 20 run in ring 3P under the control of the virtual machine monitor 22. The kernel and core system drivers 20 have some protection from each other at the expense of the user to kernel mode transition.

In this model, the virtual machine monitor 22 loads first and loads a kernel and core system drivers into ring 3P. The virtual machine monitor can no longer do a late load as would be possible with the embodiment shown in FIG. 1. The deprivileged drivers 16, and user level application 12 continue to run inside a virtual machine 14.

Figure 3:
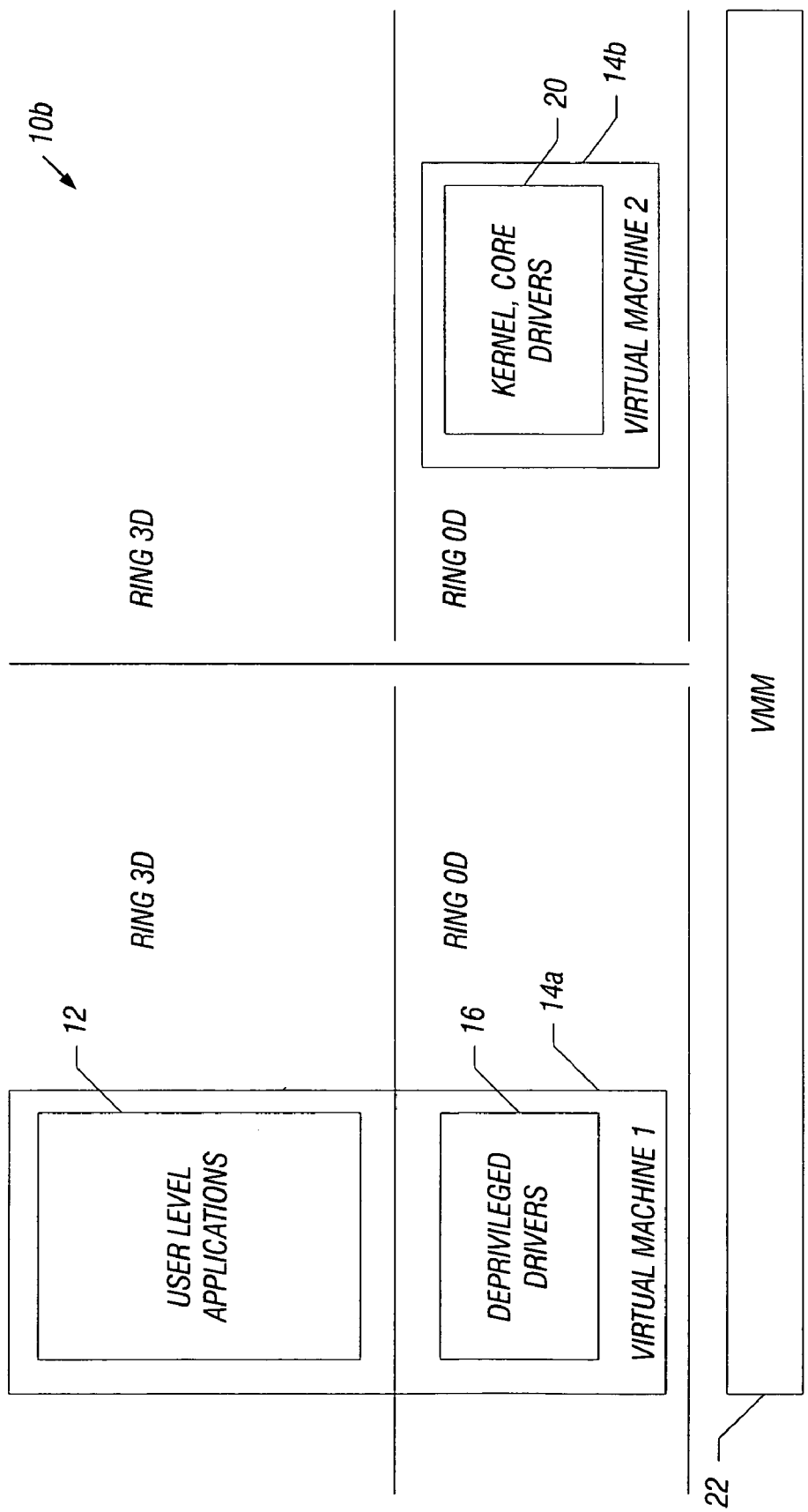
FIG. 3 is a schematic depiction of another embodiment of the present invention.

Referring to FIG. 3, in accordance with another embodiment of the present invention, two virtual machines 14a and 14b are utilized. The virtual machine 14a holds the deprivileged drivers 16 and the applications 12. The virtual machine 14b holds the kernel and core drivers 20.

In this case, the virtual machine monitor 22 may load first and create the two virtual machines 14a and 14b. The virtual machine 14b contains the kernel and core system drivers 20 that run in a memory segment isolated from the virtual machine monitor 22 and the other virtual machine 14a running on the same platform. Once the kernel virtual machine 14b is up and running, the virtual machine monitor 22 can create the second virtual machine 14a and continue loading the deprivileged drivers 16 and the applications 12 into the virtual machine 14a.

Different parts of the kernel, including individual drivers, may also be loaded into separate virtual machines to provide even more isolation of untrusted components. An isolated driver may be more easily dealt with by removing the offending virtual machine, rerouting a connection inside the kernel to compensate for the forcible driver removal. In addition, the driver may be reloaded automatically. Specially written drivers may detect reloading and, instead of initializing the hardware to a known state, try to pick up where the previous instance of the driver left off.

By using the memory partitioning aspect of VMX, an operating system kernel can isolate itself away from third party or other untrusted components, thereby making the entire system more reliable in some embodiments. The kernel can then provide better fault isolation in recovery mode, in some cases.

The kernel disaster recovery may include a determination to either log the error locally or via a network or even to try to correct the problem and restart the virtual machine. In the worst case, the kernel can shut down the virtual machine and restart it without having to go through a full reboot. A limited reboot could be much faster than a normal reboot.

Figure 4:
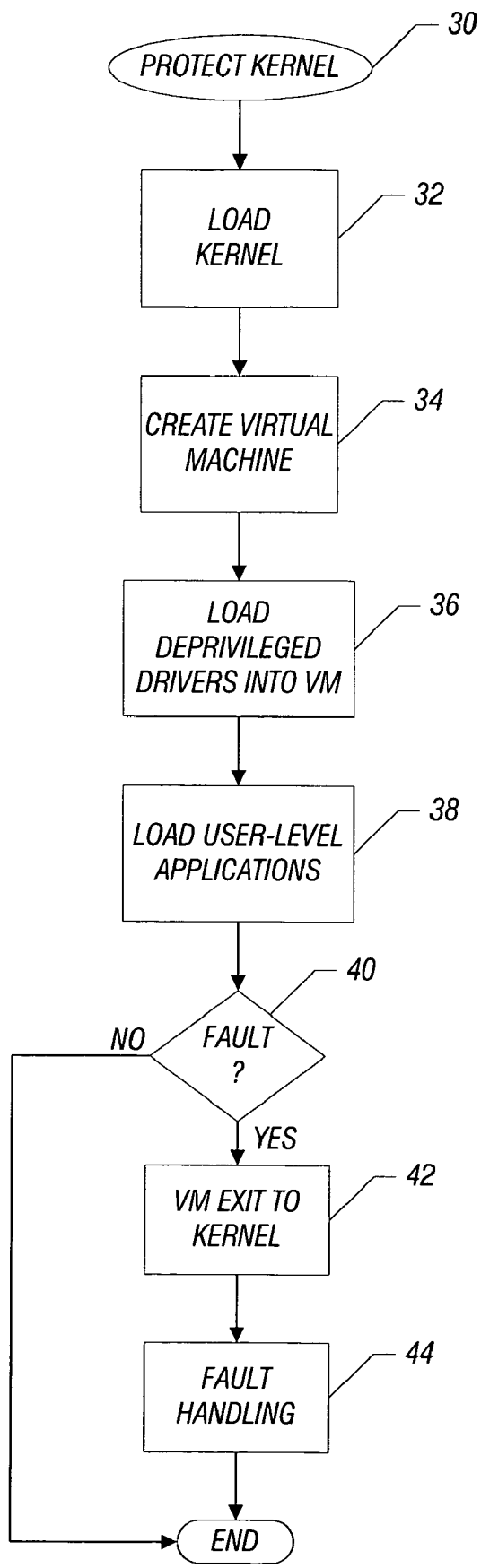
FIG. 4 is flow chart for software in accordance with one embodiment of the present invention.

Referring to FIG. 4, in accordance with one embodiment, the kernel may be protected by the software 30. Initially, the kernel may be loaded by the virtual machine monitor as indicated in block 32. The virtual machine monitor may then create the virtual machine as indicated on block 34. Deprivileged drivers and applications may be loaded into the virtual machine as a indicated blocks 36 and 38.

If a deprivileged driver experiences a fault, as determined in diamond 40, a virtual machine exit may allow control to be transferred back to the kernel as indicated in block 42. The kernel may then implement appropriate fault handling as indicated in block 44. In this case, the software has transferred from guest operations to monitor operations.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    loading a deprivileged driver into a virtual machine separate from an operating system kernel;
    providing a virtual machine monitor as an entity separate from said kernel; and
    loading the virtual machine monitor before the kernel.

2. The method of claim 1 wherein loading a deprivileged driver includes loading third party driver in said virtual machine.

3. The method of claim 1 including operating said virtual machine with a virtual machine monitor.

4. The method of claim 1 including destroying said virtual machine in the event of a fault in said driver.

5. The method of claim 1 including executing a virtual machine exit in the event of a fault in said driver.

6. The method of claim 1 including returning control to said kernel in the event of a fault in said driver.

7. The method of claim 1 including providing the virtual machine monitor with the kernel in ring 0.

8. The method of claim 1 including providing a second virtual machine for said kernel.

9. The method of claim 1 including causing a virtual machine monitor to create said virtual machine.

10. An article comprising a medium storing instructions that, if executed, enable a processor-based system to:
    develop a virtual machine to handle a deprivileged driver;
    enable said system to establish a virtual machine monitor separate from a kernel; and
    enable said system to load said virtual machine monitor before the kernel.

11. The article of claim 10 further storing instructions that, if executed, enable said virtual machine to isolate the kernel from said driver.

12. The article of claim 11 further storing instructions that, if executed, enable said system to establish a virtual machine monitor in ring 0 with said kernel.

13. The article of claim 11 further storing instructions that, if executed, enable said system to establish a second virtual machine for said kernel.

14. The article of claim 10 further storing instructions that, if executed, enable said system to develop a virtual machine to handle a driver from a first source different from the source of the kernel.

15. The article of claim 10 further storing instructions that, if executed, enable said system to control said virtual machine through a virtual machine monitor.

16. The article of claim 10 further storing instructions that, if executed, enabled said system to terminate said virtual machine in the event of a fault in said driver.

17. The article of claim 10 further storing instructions that, if executed, enable said system to perform a virtual machine exit in the event of a driver fault.

18. The article of claim 10 further storing instructions that, if executed, enable said system to allow said kernel to resume control in the event of a driver fault.

19. The article of claim 10 further storing instructions that, if executed, enable said system to create said virtual machine with a virtual machine monitor.

20. The article of claim 10 further storing instructions that, if executed, enable said system to, in response to a driver fault, use the kernel to decide whether to shut down the virtual machine or to correct the fault.

* * * * *